Aug. 12, 1924.

H. E. MILLS 1,505,079

TAXICAB IDENTIFIER

Filed April 9, 1923

Inventor
Harry Edgar Mills.
By his Attorney C. Campbell Hunick

Patented Aug. 12, 1924.

1,505,079

UNITED STATES PATENT OFFICE.

HARRY EDGAR MILLS, OF NEW YORK, N. Y.

TAXICAB IDENTIFIER.

Application filed April 9, 1923. Serial No. 630,749.

*To all whom it may concern:*

Be it known that I, HARRY EDGAR MILLS, a subject of the King of Great Britain, and resident of New York, in the county of New York and State of New York, have invented certain new and useful Improvements in Taxicab Identifiers, of which the following is a specification.

This invention relates to a taxicab identifier and fare receipt.

It is a more or less common occurrence that the user of a taxicab is desirous of again locating the taxicab previously used, either to recover valuable articles inadvertently left therein or for some other reason. The user seldom makes a practice of writing down or remembering the license number. The taxicab drivers have been known to overcharge, and the taxicab is becoming more and more an aid to the commission of crimes. Such taxicabs have the same appearance as the ones operated by legitimate companies and the travelling public has no means to distinguish such taxicabs. The proper control of taxicabs has been of much concern to the general public.

One of the objects of this invention is to provide a user of a taxicab with a means for completely identifying the taxicab and driver prior to the user's entry into the taxicab in order that the propective passenger may be enabled to distinguish the taxicabs operated by a legitimate company or individual owners from the others which latter, because of their illegal methods, will not care to utilize applicant's invention, and hence the public by discriminating against the taxicabs that fail to give identifiers will reduce the number that lend themselves to sharp practices and even crime. Still another object of the invention is to enable the user to locate and identify a taxicab that he has used in case he has left any valuables therein, or for any other reason. Another object of this invention is to provide the employer of the taxicab to check up upon the amounts received by the driver. Still another object of this invention is to hinder overcharging and in such case to enable the passenger to secure a refund.

Referring to the drawings:

Figure I, is a plan view of a device embodying the principles of my invention.

Figure II, is a plan view of the reverse side of my invention.

Figure III, is a view in perspective of the device partly broken off showing the part C folded back on part B.

I propose to provide a sheet or slip 1 of convenient size made up of three portions of parts A, B and C. Part A is separable along perforated line 2 from part B, and part B is likewise separable along perforated line 3 from part C. Part A contains thereon means for completely identifying the taxicab, such as the name of the company, 4, the taxi number, 5, the license number, 6, the driver's license number, 7, the company cab number, 8, and printed so as to straddle the perforated line 3, is the name of the company, 4', and the number 10, of the slip 1. Part B contains the name of the company 4", figures to represent the amount of the fare in squares 12, figures to represent the days of the month in squares 13, whether morning or afternoon, in squares 14, and the driver's license number in square 15. Part C is identical with part B in order that when C is folded back along 17 on part B squares 15 and 15', 12 and 12', etc., coincide. On each side of fold line 17 I provide holes 18 to enable a sheaf of identifiers to be bound up in a loose leaf binder in book form.

The operation of the device is as follows:

Prior to the entry of the passenger into the taxicab, the taxicab driver tears part A from slip 1 and delivers it to the prospective passenger who then has a complete identifier of the taxicab and driver and knows that he will receive a receipt at the end of his trip. Upon the termination of the ride the driver simultaneously punches parts B and C to show the number of passengers, the amount of the charge, the date of the month and whether morning or afternoon, and delivers part B to the passenger and retains part C for his employer.

It will thus be seen that the passenger is provided with a means to guide him in his choice of taxicabs and thereby tends to eliminate the taxicabs that prey upon the public and at the same time furnishes the passengers with a means to identify the taxicabs used by him without inconvenience to himself and in addition furnishes him with a receipt for his fare. As the two parts B and C are punched at the same time, the owner will also have a check up upon the driver's receipts.

The arrangement shown is the preferred embodiment of my invention but obviously the location of the calendar, or the amount of the fare, etc., might be varied and still fall within the principles of my invention. I have also bound the slips, one in book form in order that they may be more conveniently handled by the taxicab driver.

What I claim is:

1. A taxicab identifier comprising a sheet, said sheet divided into three portions by perforations to permit of separation of one portion from another, one of said separable portions having means to identify the driver, taxicab and company and the other two of said separable portions having identical means to identify the fare, number of passengers and the day of the month, the said identical means being so located and arranged that when the portions are superposed they will be in registration.

2. A taxicab identifier comprising a sheet, said sheet divided into three portions by perforations, to permit of separation of one portion from another, one of said separable portions having means to identify the driver, taxicab and company and the other two of said separable portions having identical means to identify the fare, number of passengers, driver, name of company, drivers license number, day of month, the said identical means being so located and arranged that when the portions are superimposed they will be in registration and means for identifying each portion as a part of said sheet after separation.

Signed at New York, in the county of New York and State of New York this 7th day of April A. D. 1923.

HARRY EDGAR MILLS.